(No Model.)

R. S. WARING.
MAKING JOINT CONNECTIONS IN ELECTRIC CABLES.

No. 294,546.  Patented Mar. 4, 1884

Witnesses
R. H. Whittlesey.
C. M. Clarke.

Inventor
Richard S. Waring
by George H. Christy
his Atty.

UNITED STATES PATENT OFFICE.

RICHARD S. WARING, OF PITTSBURG, PENNSYLVANIA.

MAKING JOINT-CONNECTIONS IN ELECTRIC CABLES.

SPECIFICATION forming part of Letters Patent No. 294,546, dated March 4, 1884.

Application filed August 9, 1883. (No model.)

*To all whom it may concern:*

Be it known that I, RICHARD S. WARING, a citizen of the United States, residing at Pittsburg, county of Allegheny, State of Pennsylvania, have invented or discovered a new and useful Improvement in Making Joint-Connections in Electric Cables; and I do hereby declare the following to be a full, clear, concise, and exact description thereof, reference being had to the accompanying drawings, making a part of this specification, in which—like letters indicating like parts—

Figure 1:
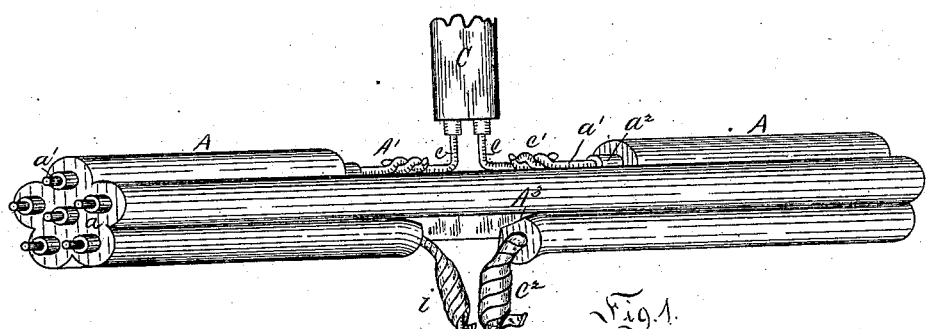
Figure 2:
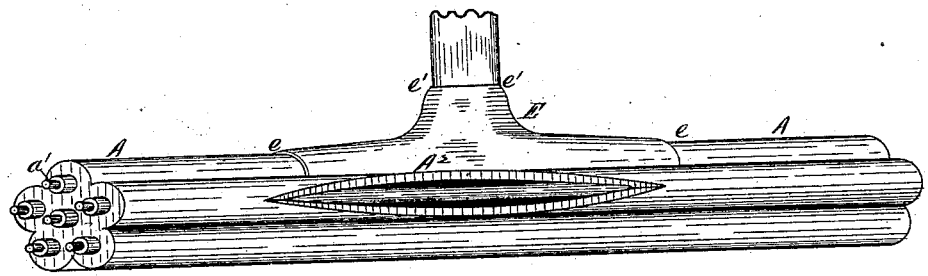

Figure 1 is a perspective view of a portion of cable, showing two loop-joints partially formed, the same being illustrative of my invention; and Fig. 2 is a similar view, showing the joint completed.

My invention relates to certain improvements in making joints for branches or loops leading from a lead-covered electric cable; and, in general terms, it consists in removing the lead covering from a wire of the cable, severing it, removing the insulating covering, and making electrical connection between such ends and the exposed ends of the wires of the branch cable or loop, then re-covering the exposed metallic surfaces of the conductors with electric insulating material, and inclosing the whole in a wiped joint of solder, making a solid connection thereby between the metal covering of the cable proper and of the loop, as hereinafter more fully described and claimed.

In the drawings, A represents a short section of compound electric cable, having a body, $a$, of lead, inclosing insulated conducting-wires $a'$, each in its appropriate passage through the lead body. The cable shown has a longitudinally ribbed or corrugated form of exterior, a wire, $a'$, being inclosed with each such rib. This form and construction of cable affords many advantages in use, and therefore I have shown it as the preferred form; but I do not wish to limit my invention by this or any particular form of lead-covered cable, or cable covered with an equivalent soft ductile metal or alloy, as it may be applied to advantage in making branch or loop connections with the various kinds and forms of cables of this class known in the art. In making such connection I expose or uncover a short length— say about three inches, more or less—of the cable-wire $a'$ with which connection is to be made. This may be done in various ways; for example, by cutting away the body of metal covering, as at $A'$, Fig. 1, when the wire may be severed, or the metal covering may be slitted longitudinally and opened or spread, as at $A^2$, Fig. 2, thus exposing the desired length of wire; or, again, when ribbed cables, such as shown, are used, a rib, with its inclosed wire, may be divided from the main body any desired length by cutting through the metal body along the bases of the grooves, as at $A^3$. The wire may then be severed, and, if desired, its ends be bent outward and exposed or denuded a suitable length for making electrical connection therewith. Electrical connection between wires may be made by removing the insulating covering $a^2$ from the wire ends, and then uniting them with the naked wire ends $c$ of the branch cable C. This may be done by twisting the wire ends together, as at $c'$, or by lapping and soldering them, or in any other suitable way known in the art. The branch cable C is of the same class or kind as the main cable, consisting of a soft-metal body inclosing the desired number of insulated conductors $c$. The wire ends being connected as described, their exposed metallic surfaces are covered or wrapped with any suitable electrical insulating material, $i$—for example, such as is commonly employed for kindred purposes in the art; and, if desired, the exposed insulating covering of the wires may be wrapped or inclosed with a light sleeve or covering of metal, $c^2$, to prevent direct contact of the solder covering therewith. In many cases, however, this will not be necessary, and therefore I do not wish to limit my invention to such use. The whole joint-connection is then inclosed within or covered by a plumber's wipe-joint, E, of solder, the same being applied and manipulated in the usual way practiced by plumbers, working well into the surface of both the main cable, as at $e$, and also of the branch cable, as at $e'$, making a solid solder union between the two, connecting them firmly and completely incasing the united conductors. The united wire ends will thus be covered and protected substantially like the remaining parts of their length, so that they will work throughout under substantially similar conditions. The joint or union thus made is inexpensive, can be made quickly and at any desired points in the cable, either before or after laying the same, and the joint, when made, will be durable, and effective in excluding moisture and protecting the wires from electrical induction and from external injury.

In a separate application filed by me February 26, 1883, Serial No. 86,373, I have described and claimed a wiped joint for connecting sections of cable or cable ends, and also the method of making the same; and I make no claim herein to such joint or method as there applied, my present invention having reference especially to making branch or loop connection with a wire or wires of a cable at any point or points along its side.

I have shown and described a loop or branches formed with one wire of the cable; but the same features of construction may be applied in similar manner to making joint-connection with two or more wires of the cable, either at the same or different points, and with the branching wires included in one or more branch cables, and all such modifications I consider as coming within my invention.

I claim herein as my invention—

1. The method herein described of making branch or loop connections in lead-covered electric cables, consisting in removing the metal covering of and exposing the wire at the side of the cable-body, severing such wire and connecting its ends by metallic contact with the exposed ends of the wires of a branching cable, re-covering the exposed wire surfaces with insulating material, and finally inclosing the wire connection thus made in a plumber's wiped joint of solder, making solid union thereby between the side of the main cable and the branching cable, substantially as set forth.

2. A cable, A, having a soft-metal body inclosing insulated conducting-wires therein, having one or more such wires severed and exposed at the side of the cable, in combination with branching cable C, the same being metal-covered, and having its wires connected electrically with the exposed ends of the severed wire or wires of the main cable, insulating covering $i$, and a plumber's wipe, E, of solder, inclosing the connected wire ends and making solid connection between the metal covering of the branching cable and the side of the main cable, substantially as set forth.

3. A cable, A, having a soft-metal body inclosing insulated conducting-wires therein, with one or more such wires exposed and severed at the side of the cable, in combination with metal-covered cable C, having its wire ends connected with the exposed wire ends of cable A, an insulating covering, $i$, and a metal covering, $c^2$, for each wire connection, and a plumber's wipe, E, of solder, inclosing such wire connections and making a solid union between the metal covering of the branching cable and the side of the main cable, substantially as set forth.

In testimony whereof I have hereunto set my hand.

RICHARD S. WARING.

Witnesses:
R. H. WHITTLESEY,
C. L. PARKER.